United States Patent [19] [11] 4,111,707
Komorita et al. [45] Sep. 5, 1978

[54] OPTICAL GLASS

[75] Inventors: Fujio Komorita, Hachioji; Nobuhiro Nozawa, Sagamihara; Satoshi Inoue, Tsukui, all of Japan

[73] Assignee: Kabushiki Kaisha Ohara Kogaku Garasu Seizosho, Sagamihara, Japan

[21] Appl. No.: 860,428

[22] Filed: Dec. 14, 1977

[51] Int. Cl.² ............................ C03C 3/08; C03C 3/14
[52] U.S. Cl. ..................................... 106/47 Q; 106/54
[58] Field of Search ................................ 106/47 Q, 54

[56] References Cited

U.S. PATENT DOCUMENTS 3,958,999 5/1976 Izumitani et al. .................. 106/47 Q Primary Examiner—O. R. Vertiz
Assistant Examiner—Mark Bell
Attorney, Agent, or Firm—Ladas, Parry, Von Gehr, Goldsmith & Deschamps

[57] ABSTRACT

An optical glass consisting essentially of a $B_2O_3$-$SiO_2$-$La_2O_3$-$Gd_2O_3$-$Y_2O_3$ system and additionally containing $ZrO_2$ has high refractive and low dispersive characteristics and is free of a poisonous thorium oxide ingredient.

2 Claims, 1 Drawing Figure

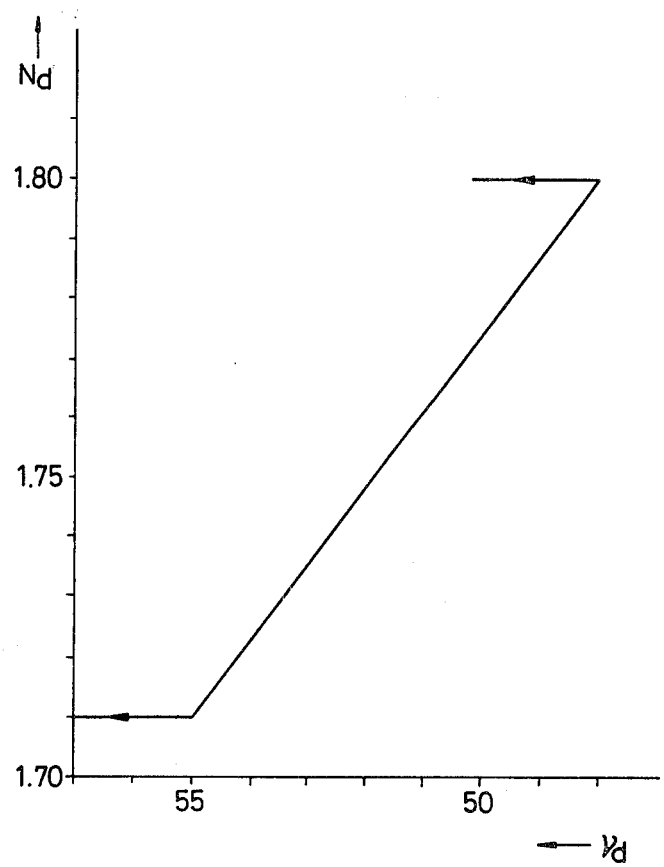

OPTICAL GLASS

BACKGROUND OF THE INVENTION

This invention relates to an optical glass and, more particularly, to an optical glass which is stable and free of poisonous ingredients and has a refractive index (Nd) within a range of 1.71 – 1.80 and Abbe number (νd) greater than values on a line connecting a point where Nd is 1.71 and νd is 55.0 and a point where Nd is 1.80 and νd is 48.0 in the co-ordinates shown in the accompanying drawing in which the ordinate represents the refractive index (Nd) and the abscissa represents Abbe number (νd).

The optical glasses having the above described optical properties, that is, having a high refractivity and a great Abbe number (i.e. low dispersion), are very useful for the designing of optical instruments so that various developments have been made to obtain such optical glasses. Known in the art of such optical glasses are those of a $B_2O_3$-$La_2O_3$-$ThO_2$ system as disclosed in the specification of U.S. Pat. No. 2,434,146 and those of a $B_2O_3$-$La_2O_3$-$Ta_2O_5$-$ThO_2$ as disclosed in the specification of U.S. Pat. No. 2,150,694. These known optical glasses, however, are not suitable for commercial production since they contain $ThO_2$ which is poisonous to humans because of its radioactivity and also are not sufficiently stable and has a tendency to devitrification. For eliminating these disadvantages, glasses of a $B_2O_3$-$La_2O_3$-$Gd_2O_3$-$Ta_2O_5$ system as disclosed in the specification or British patent No. 1,183,996, those of a $B_2O_3$-$La_2O_3$-$Gd_2O_3$-RO (wherein RO is a divalent metal oxide) system and those of a $B_2O_3$-$La_2O_3$-$Gd_2O_3$-$Ta_2O_5$-RO system as disclosed in the specification of U.S. Pat. No. 3,958,999 have been developed. These optical glasses, however, are disadvantageous in that the above described desired optical properties can hardly be obtained.

SUMMARY OF THE INVENTION

It is, therefore, an object of the present invention to provide an optical glass which is stable and free of poisonous ingredients and has the above described desirable optical properties.

As a result of concentrated studies and repeated experiments, the inventors of the present invention have found that the above object can be attained by adding a content of $ZrO_2$ within a certain percentage range to an optical glass of a $B_2O_3$-$SiO_2$-$La_2O_3$-$Gd_2O_3$-$Y_2O_3$ system.

According to the present invention, there is provided an optical glass consisting of a composition in weight percent of 26 to 38% $B_2O_3$, 0.5 to 7% $SiO_2$, 31 to 38% $La_2O_3$, 17 to 30% $Gd_2O_3$, 1 to 7% $Y_2O_3$, the total of said $La_2O_3$, $Gd_2O_3$ and $Y_2O_3$ being 58 to 64%, 0 to 8% $ZrO_2$, 0 to 2% $SnO_2$, 0 to 2% $GeO_2$, an oxide or oxides selected from the group consisting of $Li_2O$, $Na_2O$ and $K_2O$, the total of said $Li_2O$, $Na_2O$ and $K_2O$ being 0 to 0.5%, and an oxide or oxides selected from the group consisting of MgO, CaO, SrO, BaO, ZnO and $Al_2O_3$, the total of said MgO, CaO, SrO, BaO, ZnO and $Al_2O_3$ being 0 to less than 2%.

According to the invention, there is also provided an optical glass consisting of the same composition as described above and further including a fluoride or fluorides in substitution, in part or in whole, for the oxide or oxides of the same element or elements as said fluoride or fluorides among the ingredients of said composition, the total amount of fluorine contained in said fluoride or fluorides being in a proportion of up to 2% by weight.

DETAILED DESCRIPTION OF THE INVENTION

In the optical glass made according to the present invention, the above described content ranges of the respective ingredient have been selected for reasons stated below.

If the content of $B_2O_3$ is less than 26%, the devitrification tendency increases and the glass becomes unstable whereas if it exceeds 38%, the desired optical properties cannot be obtained.

$SiO_2$ contributes to preventing devitrification. If the content of $SiO_2$ is less than 0.5%, such effect will be reduced whereas if it exceeds 7%, the $SiO_2$ material becomes hard to melt and besides the desired dispersion cannot be obtained.

The three ingredients of $La_2O_3$, $Gd_2O_3$ and $Y_2O_3$ should be present together in the optical glass according to the invention for providing the glass with the desired optical properties and stability without the tendency to devitrification. Increasing or decreasing the content of $La_2O_3$ outside of the rnage of 31 to 38% and that of $Gd_2O_3$ outside of the range of 17 to 30% occasions increase in the devitrification tendency and also causes phase separation and difficulty in the melting of the $SiO_2$ material into the glass. If the content of $Y_2O_3$ is less than 1%, the devitrification tendency increases and causes difficulty in the melting of the $SiO_2$ material whereas if the content of $Y_2O_3$ exceeds 7%, the devitrification tendency increases. Further, if the total amount of these three ingredients is less than 58%, the desired optical properties cannot be obtained whereas if this total amount exceeds 64%, the devitrification tendency increases sharply. It is an important feature of the present invention that the most stable optical glass has been found to be obtained by limiting the content ranges of the three ingredients to the above described ranges.

$ZrO_2$ is an essential ingredient for increasing refractivity within the optical property ranges of the optical glass according to the present invention while maintaining stability without the tendency to devitrification. Such effect of $ZrO_2$ is increased if $ZrO_2$ is introduced in the glass while holding the content of $B_2O_3$ at a relatively small amount. If, however, the content of $ZrO_2$ exceeds 8%, the glass becomes hard to melt and Abbe values corresponding to refractive indices become lower than the desired values to be achieved by the present invention.

$SnO_2$, $GeO_2$, $Li_2O$, $Na_2O$, $K_2O$, MgO, CaO, SrO, BaO, ZnO and $Al_2O_3$ are included for assisting melting of the glass and prevention of devitrification.

More specifically, $SnO_2$ contributes to decreasing the devitrification tendency but increasing the content thereof above 2% occasions increase in dispersion and an undesirable tinting of the glass.

$GeO_2$ is effective for preventing separation of the $SiO_2$ material in melting of the glass and decreasing the devitrification tendency. If the content of $GeO_2$ exceeds 2%, such effects will be reduced instead of being increased and besides dispersion will be increased.

$Li_2O$, $Na_2O$ and $K_2O$ are effective for assisting melting of the $SiO_2$ material and stabilizing the glass. If, however, the total of one or more of these ingredients exceeds 0.5%, the devitrification tendency increases.

MgO, CaO, SrO, BaO and ZnO contribute to assisting melting of the $SiO_2$ material and making of a stable glass. $Al_2O_3$ contributes to preventing separation of the $SiO_2$ material and making of a stable glass by increasing viscosity. If, however, the total of one or more of these ingredients exceeds 2%, the devitrification increases and dispersion becomes higher than the desired value.

According to another embodiment of the invention, one or more of the above described oxides of the respective elements may be replaced, in part or in whole, by fluorides of these respective elements for further facilitating melting of the glass and making a low dispersive glass. As such fluorides, $La_2F_3$, $YF_3$, $AlF_3$, NaF and $ZnF_2$, for example, may be used. The content of fluorine in the glass should not exceed 5% in terms of the amount of $F_2$ because increasing the content of fluorine above 5% occasions an increase in the devitrification tendency in the surface region of the glass.

Compositions of the optical glass made according to the present invention and optical properties (Nd νd) of these compositions are shown by way of example in Tables 1 and 2. As will be seen in Table 2, the optical glasses of these examples all have a high refractivity (Nd) and great Abbe values (νd) relative to their refractive indices (Nd) and therefore satisfy the optical properties expected by the present invention.

The optical glass according to the present invention can be readily produced by melting the raw materials at a temperature within a range of about 1300° – 1350° C, stirring and refining the melt, cooling it to a temperature of 1150° C or less, removing inhomogeneity by finishing stirring, pouring the melt in a mould and annealing it.

Table 2

| No. | Nd | νd |
| --- | --- | --- |
| 1 | 1.7578 | 51.5 |
| 2 | 1.7243 | 54.3 |
| 3 | 1.7150 | 55.2 |
| 4 | 1.7850 | 49.8 |
| 5 | 1.7445 | 52.6 |
| 6 | 1.7420 | 53.3 |
| 7 | 1.7610 | 51.2 |
| 8 | 1.7465 | 52.4 |
| 9 | 1.7495 | 52.2 |
| 10 | 1.7514 | 52.2 |
| 11 | 1.7222 | 54.9 |
| 12 | 1.7690 | 51.1 |
| 13 | 1.7410 | 52.8 |
| 14 | 1.7321 | 53.8 |
| 15 | 1.7430 | 52.6 |
| 16 | 1.7855 | 50.1 |
| 17 | 1.7935 | 49.4 |
| 18 | 1.7329 | 54.5 |
| 19 | 1.7210 | 55.4 |

What is claimed is:

1. An optical glass substantially consisting of a composition in weight percent of 26 to 38% $B_2O_3$, 0.5 to 7% $SiO_2$, 31 to 38% $La_2O_3$, 17 to 30% $Gd_2O_3$, 1 to 7% $Y_2O_3$, the total of said $La_2O_3$, $Gd_2O_3$ and $Y_2O_3$ being 58 to 64%, 0 to 8% $ZrO_2$, 0 to 2% $SnO_2$, 0 to 2% $GeO_2$, an oxide or oxides selected from the group consisting of $Li_2O$, $Na_2O$ and $K_2O$, the total of said $Li_2O$, $Na_2O$ and $K_2O$ being 0 to 0.5%, and an oxide or oxides selected from the group consisting of MgO, CaO, SrO, BaO, ZnO and $Al_2O_3$, the total of said MgO, CaO, SrO, BaO, ZnO and $Al_2O_3$ being 0 to less than 2%.

2. The optical glass according to claim 1 which includes a fluoride or fluorides in substitution, in part or in whole, for the oxide or oxides of the same element or elements as said fluoride or fluorides among the ingredients of said composition, the total amount of fluorine contained in said fluoride or fluorides being in a proportion of up to 5% by weight in terms of the amount of $F_2$.

* * * * *

Table 1

| No. | $B_2O_3$ | $SiO_2$ | $La_2O_3$ | $Gd_2O_3$ | $Y_2O_3$ (weight percent) | $Re_2O_3$ | $ZrO_2$ | Other | Other | Other |
| --- | --- | --- | --- | --- | --- | --- | --- | --- | --- | --- |
| 1 | 32.6 | 1.5 | 36.0 | 20.0 | 4.0 | 60.0 | 4.0 | BaO 0.4 | $SnO_2$ 1.5 | |
| 2 | 34.0 | 4.8 | 31.5 | 24.5 | 2.7 | 58.7 | 0.5 | CaO 1.8 | | $Na_2O$ 0.2 |
| 3 | 37.0 | 4.0 | 34.5 | 19.5 | 4.0 | 58.0 | | BaO 1.0 | | |
| 4 | 26.0 | 3.5 | 34.8 | 25.5 | 2.2 | 62.5 | 6.5 | | $GeO_2$ 1.5 | |
| 5 | 33.5 | 3.0 | 37.5 | 19.0 | 4.0 | 60.5 | 3.0 | | | |
| 6 | 34.0 | 2.0 | 36.0 | 25.0 | 3.0 | 64.0 | | | | |
| 7 | 32.5 | 2.0 | 35.0 | 20.0 | 3.0 | 58.0 | 7.5 | | | |
| 8 | 35.0 | 0.5 | 34.0 | 22.0 | 2.8 | 58.8 | 4.5 | SrO 1.2 | | |
| 9 | 29.0 | 6.0 | 35.0 | 20.0 | 5.0 | 60.0 | 3.0 | ZnO 1.8 | | $K_2O$ 0.2 |
| 10 | 32.2 | 2.5 | 36.0 | 17.5 | 6.5 | 60.0 | 3.3 | CaO 1.7 | | $Li_2O$ 0.3 |
| 11 | 37.3 | 2.7 | 36.0 | 20.0 | 4.0 | 60.0 | | | | |
| 12 | 26.0 | 7.0 | 32.5 | 28.5 | 1.0 | 62.0 | 5.0 | | | |
| 13 | 36.5 | 0.5 | 36.0 | 17.5 | 6.5 | 60.0 | 3.0 | | | |
| 14 | 34.0 | 5.0 | 31.5 | 24.5 | 2.5 | 58.5 | 2.5 | | | |
| 15 | 33.0 | 2.0 | 34.5 | 24.0 | 1.5 | 60.0 | 3.2 | MgO 0.3 | $Al_2O_3$ 1.5 | |
| 16 | 28.5 | 1.0 | 33.5 | 26.0 | 3.5 | 63.0 | 6.0 | ZnO 1.0 | $GeO_2$ 0.5 | |
| 17 | 26.5 | 2.0 | 35.0 | 25.0 | 3.0 | 63.0 | 7.5 | | $SnO_2$ 1.0 | |
| 18 | 34.0 | 3.0 | 35.0 | 20.5 | 5.0 | 60.5 | | $ZnF_2$ 2.5 ($F_2$=0.9) | | |
| 19 | 33.5 | 4.0 | 22.0 | 19.0 | 5.0 | 61.0* | | $LaF_3$ 15.0 ($F_2$=4.4) | CaO 1.2 | $Li_2O$ 0.3 |

$Re_2O_3$ represents the total amount of $La_2O_3$, $Gd_2O_3$ and $Y_2O_3$ (* including fluorides)